United States Patent Office 3,387,030
Patented June 4, 1968

3,387,030
PRODUCTION OF METHYLSEMICARBAZIDES AND MONOMETHYLHYDRAZINES
Charles R. Walter, Jr., Hopewell, Va., assignor to Allied Chemical Corporation, New York, N.Y., a corporation of New York
No Drawing. Continuation-in-part of application Ser. No. 104,222, Apr. 20, 1961. This application Oct. 23, 1961, Ser. No. 147,087
5 Claims. (Cl. 260—554)

This is a continuation-in-part of my copending application Ser. No. 104,222 filed Apr. 20, 1961, and now abandoned. This invention relates to an improved process for the preparation of monomethylhydrazine from a nitrosomethylurea. More particularly, it relates to an improved process for the reduction of a nitrosomethylurea to its corresponding N-amino derivative.

The rapid increase of interest in guided missiles and rockets for military use has created a great demand for high energy fuels such as unsymmetrical dimethylhydrazine and monomethylhydrazine.

A process has been proposed for the preparation of monomethylhydrazine wherein N-methyl-N-nitrosourea is reduced in the presence of zinc and acetic acid to the corresponding N-amino compound which is subsequently hydrolyzed with aqueous mineral acid to the salt of monomethylhydrazine. The reduction step of this process, which uses the nascent hydrogen produced by the action of acid on zinc, is quite costly and corrosive to equipment.

In an attempt to circumvent the high cost and corrosiveness inherent in the chemical reduction of nitroso groups, a procedure has recently been proposed for the production of unsymmetrical dimethylhydrazine wherein the N-nitrosodimethylamine produced by the nitrosation of dimethylamine is reduced by catalytic hydrogenation over a platium catalyst. Since a similar route to monomethylhydrazine is not open because of the instability of nitrosomethylamine, a different procedure is necessary for the preparation of monomethylhydrazine.

It is accordingly a principal object of the present invention to provide an improved, economical process for hydrogenating N-nitroso-N-methylurea and N-nitroso-N,N'-dimethylurea to produce the corresponding N-amino derivatives which can be hydrolyzed to produce monomethylhydrazine.

Another object of the invention is to provide a process for hydrogenating N-nitroso-N-methylurea and N-nitroso-N,N'-dimethylurea to the corresponding amino derivatives which, in its preferred embodiment, avoids the high cost and corrosive nature of the prior art hydrogenation processes.

In accordance with the present invention, a nitrosomethylurea selected from the group consisting of N-nitroso-N-methylurea and N-nitroso-N,N'-dimethylurea, is hydrogenated at superatmospheric pressures, and at temperatures within the range of 20° to 60° C., in the presence of a finely-divided, supported, platinum catalyst at a concentration of about 10 to about 125 grams of catalyst per mol of nitroso compound in a liquid reaction medium in which the nitroso compound is at least partly soluble. The corresponding N-amino compounds thus produced are hydrolyzed with aqueous mineral acid to the salt of monomethylhydrazine.

The reactions involved in the process of this invention are represented by the following equations:

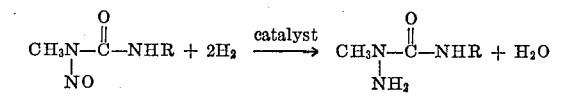
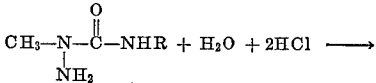
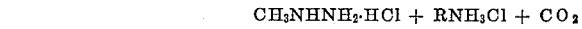

wherein R is either methyl or hydrogen.

The nitrosomethylurea and ntrosodimethylurea which are used as starting materials for the monomethylhydrazine syntheses may be readily obtained by condensing one or two moles of methylamine with urea under acidic conditions, and nitrosating the resulting N-methyl or N,N-dimethylureas. Alternatively, dimethylurea may also be prepared from the reaction of methylamine with phosgene.

The nitrosation may be effected with sodium nitrite in the presence of an acid such as hydrochloric or nitric, and the nitrosomethylurea is readily recovered from the reaction mixture by filtration. The crude nitroso compound may be hydrogenated directly, or it may be subjected to a preliminary purification treatment such as recrystallization before hydrogenation. When N-nitroso-N,N'-dimethylurea is hydrogenated within one to two days of its preparation from dimethylurea, higher yields of the N-amino derivative are obtained than when the material is used after prolonged storage under ordinary conditions.

The catalysts for the hydrogenation step are those platinum-supported catalysts which contain 2 to 15 percent by weight of platinum. Although an alumina support is preferred, other supports such as carbon, kieselguhr, pumice, and silica are applicable. Such platinum-supported catalysts may be produced by known procedures. For instance, a platinum salt such as platinic chloride may be deposited on alumina particles, treated with sodium hydroxide, and then reduced to form a platinum deposit on alumina.

The catalyst is mixed with a nitrosomethylurea, in a liquid reaction medium, to form a slurry or suspension having a concentration of from 10 to 125, preferably 15 to 30, grams of catalyst per mole of nitrosomethylurea. The weight given includes the weight of the support. The proportion of the liquid phase is not very critical, but there should be sufficient liquid phase present to form a slurry or suspension of the other ingredients. It is preferred to use a liquid reaction medium containing 2 to 40 weight percent of nitrosomethylurea. A variety of solvents meet this solubility requirement. The most notable of these are water and the aliphatic mono- and dihydric alcohols. Water is the preferred reaction medium although solvents such as aqueous acetic acid, ethanol, ethylene glycol, and mixtures of these solvents function almost as well.

The hydrogenation is preferably carried out in an acidic reaction medium, and highly alkaline conditions are avoided, since alkalis, as is well known, tend to decompose the nitrosomethylureas. While the hydrogenation can be carried out successfully in highly acidic media, I prefer to use a reaction medium which is only mildly acidic, and which has an initial pH below 7 but not less than about 6 at the start of the reaction. Progression of conditions to a neutral pH of 7 or slightly above, toward the end of the hydrogenation may sometimes occur and does no harm. The preferred acidic reaction medium may be obtained in any desired manner either by the use of an acid as a component of the reaction medium, or by utilizing a freshly prepared nitrosomethylurea which retains all or a portion of the acid used in its preparation, or by limiting the quantity of the somewhat alkaline catalyst (pH about 9.3) to an amount which leaves the reaction medium in an acid condition through the influence of the naturally acidic nitrosomethylurea, the pH value of nitrosomonomethylurea being in the neighborhood of about 4.6.

The hydrogenation may be carried out continuously by introducing a slurry of nitrosomethylurea and catalyst into a reactor designed to give the proper residence time, and withdrawing the reaction products from the exit of this reactor. Alternatively, the reaction may be carried out batchwise.

In both cases, the amount of hydrogen introduced is in excess of the stoichiometric amount required for the reduction. The amount of excess is not critical.

Although initial pressures of hydrogen of at least 50 p.s.i. are necessary for the hydrogenation of the nitrosomethylurea compounds to the corresponding N-amino derivatives, optimum yields are obtained when said hydrogenation is conducted at initial pressures of hydrogen ranging from about 800 to 2000 p.s.i. The rate at which the hydrogenation proceeds, appears to be a function, in part, of the pressure of the hydrogen. Consequently, higher hydrogen pressures should be conducive to greater rates of hydrogenation to the extent that the maximum pressure which may be used is limited primarily by economic considerations.

It must be pointed out, however, that it is desirable to allow the pressure to drop to about 1000 p.s.i. after the reaction has progressed to the point where approximately 50 percent of the nitrosomethylurea has been reduced to the N-amino compound. This decrease in pressure is apparently necessary to avoid the formation of byproducts produced by the interaction of reduced and unreduced compounds.

Although a reaction temperature of 20 to 60° C. is applicable for the hydrogenation process, the range from 25 to 45° C. is preferred.

The hydrogenation time is dependent on the concentration of nitrosomethylurea, catalyst concentration, temperature, and pressure.

The monomethylhydrazine product is readily obtainable by hydrolysis of the N-amino-N-methylurea derivative produced by the hydrogenation process discussed hereinabove. The N-methyl- or N,N'-dimethyl-N-aminourea compound is hydrolyzed by refluxing it in an aqueous, mineral acid such as hydrochloric acid, sulfuric, or phosphoric, at about 100° C. for several hours. The methylhydrazine salt thus prepared can be obtained as the free base by the addition of a water-soluble alkali. The hydroxides of the alkali metals, e.g., sodium hydroxide, are particularly useful. The monomethylhydrazine can then be distilled in order to recover the pure product.

Carrying out the hydrogenation under the preferred conditions, at pH values below 7 but not less than about 6, and using the preferred alumina supported platinum catalyst, I obtain high yields of monomethylhydrazine upon hydrolysis of the hydrogenation product; with such pH conditions and catalyst, yields of 65 to 75 percent or more are obtained in 2 to 4 hours at 25–45° C. under hydrogen pressures of 800 to 2000 p.s.i., as brought out in the specific examples which follow and which further illustrate the invention. In the examples, parts and percentages are by weight, and temperatures are in degrees centigrade. The nitroso compounds used in these examples were prepared by nitrosation with sodium nitrite and nitric acid, and isolation of the nitroso compound by filtration.

Example 1

Freshly prepared N-nitroso-N-methylurea (5 parts) was charged to a stainless steel, rocker-type autoclave along with water (200 parts) and 200 mesh 5 percent Pt on $Al_2O_3$ catalyst (5 parts). The reaction medium had a pH of 6.2. Hydrogen was introduced to provide an initial pressure of 1425 p.s.i. The autoclave was rocked at a temperature of about 30° for about 2 hours during which 1.71 moles of hydrogen were absorbed per mole of nitroso compound, and the pressure dropped to 1175 p.s.i.

The crude, aqueous product was filtered to isolate N-methyl-N-aminourea. This product was refluxed for 8 hours with 177 parts of aqueous 37% HCl, then made basic to a pH of 10–12 with 25% sodium hydroxide, and distilled until the distillate no longer gave a positive Fehling's test. The product was a dilute, aqueous solution of monomethylhydrazine, which was isolated from the solution as the sulfate by the addition of 7 parts of 96% sulfuric acid, and evaporating the resulting solution to dryness. Yield (percent of theoretical based on nitrosomethylurea) was 66.4 percent.

Example 2

Freshly prepared N-nitroso-N,N'-dimethylurea was hydrogenated in accordance with the procedure described in Example 1. In the hydrogenation step, 5 parts of catalyst was mixed with 150 parts of water and 23.4 parts of nitrosomethylurea. The hydrogenation proceeded for 2.5 hours at 25°–55° under an initial pressure of 1500 p.s.i. No additonal hydrogen was added during the course of the hydrogenation. The hydrogen pressure was below about 1000 p.s.i. after hydrogen had been absorbed to the extent of one mole of hydrogen per mole of nitroso compound. The total quantity of hydrogen absorbed amounted to 1.59 moles per mole of nitroso compound. After hydrolysis and separation as described in Example 1, the yield of monomethylhydrazine was 75.3 percent based on the nitrosodimethylurea.

Additional examples are provided in the data in Table I. The hydrogenation catalyst in every case was 200 mesh 5 percent Pt on $Al_2O_3$.

TABLE I

| Example | Percent Catalyst in $H_2O$ | Percent Nitroso compound in $H_2O$ | Initial Pressure, p.s.i. | Hydrogenation Temp., ° C. | Hydrogenation Time, hrs. | Percent Yield, methylhydrazine |
|---|---|---|---|---|---|---|
| 3 [1][2] | 2.5 | 2.1 | 1,640 | 27–50 | 4 | 60.5 |
| 4 [3] | 2.0 | [4] 16.3 | 1,500 | 25–28 | 6 | 39.2 |
| 5 [3] | 2.5 | [4] 16.3 | 1,500 | 24–61 | 4 | 48.0 |
| 6 [3] | 2.5 | 13.5 | 1,350 | 26–54 | 4 | [5] 50.8 |

[1] N-methyl-N-nitrosourea used.
[2] Initial pH of reaction medium 6.8.
[3] N,N'-dimethyl-N-nitrosourea used.
[4] Ethanol used as a solvent instead of water.
[5] N,N'-dimethyl-N-nitrosourea had been stored for two weeks prior to use.

While the above describes the preferred embodiments of the invention, it will be understood that departures may be made therefrom within the scope of the specification and claims.

I claim:
1. A process for the production of a derivative of urea having the formula

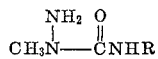

wherein R is a member selected from the group consisting of hydrogen and methyl, which comprises hydrogenating a nitrosomethylurea compound selected from the group consisting of N-nitroso-N-methylurea and N-nitroso-N,N'-dimethylurea in intimate contact with an alumina supported platinum catalyst contained in an aqueous reaction medium having a pH value ranging from about 6.2 to 6.8 wherein the concentration of said supported catalyst is from about 10 to 125 grams per mole of said nitrosomethylurea and wherein said hydrogenation occurs under a hydrogen pressure of from 50 p.s.i. to 2000 p.s.i., and at a temperature of from 20° C. to 60° C.

2. A process as described in claim 1, wherein the platinum-alumina catalyst contains from about 2 to about 15 percent by weight of platinum, and from about 85 to about 98 percent by weight of alumina.

3. A process as described in claim 1, wherein the aqueous solution of the nitrosomethylurea compound contains from about 2 to about 40 percent by weight of said nitrosomethylurea compound.

4. A process for the production of monomethylhydrazine which comprises hydrogenating a nitrosomethylurea compound selected from the group consisting of N-nitroso-N-methylurea and N-nitroso-N,N'-dimethylurea mixed with water in the presence of an alumina-supported, platinum catalyst in a concentration of about 10 to about 125 grams of said catalyst per mole of said nitrosomethylurea under a hydrogen pressure of about 50 p.s.i. to about 2000 p.s.i., said hydrogenating mixture having a pH value ranging from about 6.2 to 6.8 and a temperature of about 20° to about 60° C., recovering from said hydrogenation reaction mixture an N-amino derivative of the general formula

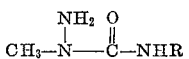

wherein R is a member selected from the group consisting of hydrogen and methyl, and hydrolyzing said amino derivative with aqueous, mineral acid to isolate the salt of monomethylhydrazine.

5. A process as described in claim 4 wherein the mineral acid is a member selected from the group consisting of hydrochloric, sulfuric, and phosphoric acids.

References Cited

UNITED STATES PATENTS 2,959,615  11/1960  Lum et al. _____ 260—554

OTHER REFERENCES

Degering: An Outline of Nitrogen Compounds (1950) pp. 377–78.

HENRY R. JILES, *Primary Examiner.*